(12) United States Patent
Miller et al.

(10) Patent No.: US 8,337,744 B2
(45) Date of Patent: Dec. 25, 2012

(54) PROCESS AND APPARATUS FOR VACUUM-ASSISTED RESIN TRANSFER MOLDING OF VERY TALL ARTICLES

(75) Inventors: Alan K. Miller, Santa Cruz, CA (US); Theodore Rosario, San Jose, CA (US); Michael M. Garcia, Gilroy, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 79 days.

(21) Appl. No.: 12/951,239

(22) Filed: Nov. 22, 2010

(65) Prior Publication Data

US 2011/0062639 A1 Mar. 17, 2011

Related U.S. Application Data

(63) Continuation-in-part of application No. 12/484,779, filed on Jun. 15, 2009, now Pat. No. 8,025,834.

(60) Provisional application No. 61/061,204, filed on Jun. 13, 2008.

(51) Int. Cl.
*B29C 41/24* (2006.01)
*B29C 43/22* (2006.01)

(52) U.S. Cl. .............................. 264/561; 264/562

(58) Field of Classification Search ............... 264/561, 264/562
See application file for complete search history.

(56) References Cited

U.S. PATENT DOCUMENTS

| | | | |
|---|---|---|---|
| 2,766,160 A | 10/1956 | Bentov |
| 3,033,730 A | 5/1962 | Martin |
| 3,067,803 A | 12/1962 | Fleury |
| 3,130,104 A | 4/1964 | Lewis et al. |
| 3,769,127 A | 10/1973 | Goldsworthy et al. |
| 3,855,031 A | 12/1974 | McNeely et al. |
| 3,975,479 A | 8/1976 | McClean |
| 4,558,971 A | 12/1985 | David |
| 4,830,809 A | 5/1989 | Liebl |
| 6,899,842 B1 | 5/2005 | Corre et al. |

FOREIGN PATENT DOCUMENTS

| | | |
|---|---|---|
| FR | 707101 | 7/1931 |
| GB | 790639 | 2/1958 |
| GB | 1453936 | 10/1976 |
| WO | WO 2007003011 A1 * | 1/2007 |

OTHER PUBLICATIONS

Hindenlang, Alison L., "U.S. Appl. No. 12/484,779 Restriction Requirement Dec. 6, 2010",, Publisher: USPTO, Published in: US.
Hindenlang, Alison L., "U.S. Appl. No. 12/484,779 Office Action Jan. 21, 2011",, Publisher: USPTO, Published in: US.
Hindenlang, Alison L., "U.S. Appl. No. 12/484,779 Notice of Allowance Jun. 17, 2011"Publisher: USPTO, Published in: US.
"Resin Transfer Molding and Structural Reaction Injection Molding", "ASM Handbook—Composites XP002552279", 2001, pp. 492-500, vol. 21, Publisher: ASM International, Published in: US.

(Continued)

*Primary Examiner* — Yogendra Gupta
*Assistant Examiner* — Alison Hindenlang
(74) *Attorney, Agent, or Firm* — Kaplan Breyer Schwarz & Ottesen, LLP (57) ABSTRACT

A method and apparatus for maintaining constant compaction pressure in a vertically oriented resin transfer molding apparatus.

10 Claims, 6 Drawing Sheets

OTHER PUBLICATIONS

Fregosi, Alberto, "PCT Application No. PCT/US2009/047388 International Preliminary Report on Patentability Oct. 21, 2010", , Publisher: PCT, Published in: PCT.

Fregosi, Alberto, "PCT Application No. PCT/US2009/047388 International Search Report Feb. 15, 2010", , Publisher: PCT, Published in: PCT.

"PCT Application No. PCT/US2009/047388 Partial Search Report Nov. 20, 2009", , Publisher: EPO, Published in: PCT.

Hindenlang, Alison L., "U.S. Appl. No. 13/184,745 Office Action Apr. 25, 2012", , Publisher: USPTO, Published in: US.

\* cited by examiner

PROCESS AND APPARATUS FOR VACUUM-ASSISTED RESIN TRANSFER MOLDING OF VERY TALL ARTICLES

STATEMENT OF RELATED CASES

This case is a continuation-in-part of U.S. patent application Ser. No. 12/484,779 filed Jun. 15, 2009, which is incorporated herein.

FIELD OF THE INVENTION

The present invention relates to the production of long-length composite materials and structures.

BACKGROUND OF THE INVENTION

There are certain advantages (e.g., weight, transport, etc.) to forming relatively long, large-diameter articles from composite materials. Examples of such articles include a smoke stack, a tunnel liner, or an OTEC ("ocean thermal energy conversion") cold-water pipe. Composite materials, which include a matrix constituent, typically a resin, and a reinforcement constituent, typically a fiber, are formed via a molding operation. But it is particularly difficult to fabricate long, large-diameter composite articles via molding processes. In particular, these articles are too long to be formed in a single "shot" (a single molding operation).

One approach to fabricating long, large-diameter articles is to mold a plurality of discrete relatively shorter-length sections and connect them via mechanical joints or adhesive bonding. Another approach is disclosed in U.S. patent application Ser. No. 12/484,779. Regardless of the approach taken, to achieve the shortest fabrication time and lowest cost, it is desirable to limit the number of molding shots required to form the article.

There are a number of manufacturing processes that are suitable for fabricating articles from composite materials. But few if any of those processes are well suited for the fabrication of extremely long, large diameter composite articles. It is notable that when molding planar parts (or articles comprised of a collection of planar parts), a horizontally oriented molding apparatus can and is used. But when molding non-planar parts, such as the cylindrical sections that would be required to form a smoke stack, etc., a vertically oriented molding apparatus must be used.

Perhaps the best option for fabricating long, large-diameter articles is a liquid-resin molding process. One liquid resin molding process is resin transfer molding ("RTM"). RTM uses a closed-cavity mold which is solid on all sides. In the simplest version of RTM, air is left in the fabric before resin injection. Some, but not all of this air is driven out through vents as the fabric fills with resin. In order to obtain an acceptable void content in the presence of this residual air, a very high pressure (about 275 psig) is sometimes applied while the resin is curing. The intent of the applied pressure is to shrink the size of any remaining air voids to acceptable levels. This large internal pressure generates substantial forces that tend to push opposing mold surfaces apart. For small molds, this problem is addressed using relatively inexpensive presses. But this approach becomes impractically expensive when dealing with large molds.

Figure 1A:
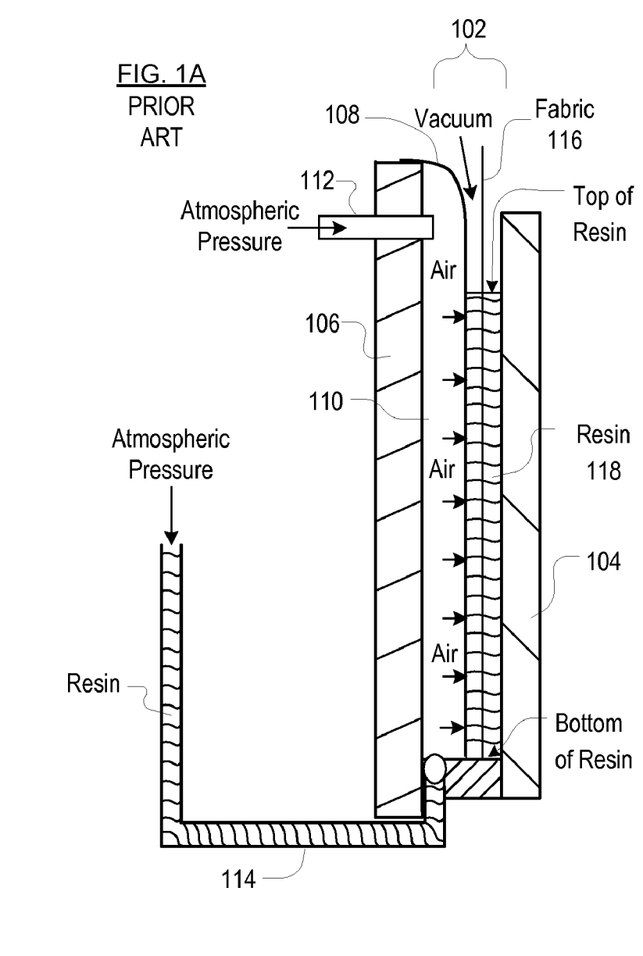
FIG. 1A depicts a cross section of a portion of a conventional, vertically oriented resin transfer molding apparatus.

Another liquid resin process is vacuum-assisted resin transfer molding ("VARTM"). VARTM uses one-sided tooling. The term "tooling" or "tool" refers to a solid entity/ surface against which the composite material is molded; it forms the shape of the molded article ("workpiece") as the liquid resin transforms into a solid. FIG. 1A depicts a cross section of portion of a vertically oriented VARTM apparatus. In this example, the mold is forming a cylindrical workpiece and, as such, the molding region would actually be ring-shaped or annular, such that a top view of the apparatus would show a ring-like molding region.

With reference to FIG. 1A, the two constituents of the nascent composite—fabric 116 and resin 118—are shown within molding region 102. The liquid resin, which is introduced through inlet line 114, is retained on one side by hard tool 104 (i.e., the "one-sided" tooling) and on the other by soft tool 108 (e.g., a resilient layer, a vacuum bag, etc.). A gas, typically air at atmospheric pressure, is introduced through gas inlet 112 behind soft tool 108 into region 110 formed between wall 106 and the soft tool. With atmospheric pressure behind soft tool 108 and zero pressure in front of it (at least near the top of the resin), compaction pressure $C_{NET}$ is applied to the solidifying composite.

All of the resin being processed in the molding region is in liquid form. If the mold is vertically oriented, as in FIG. 1A, there would be a substantial gradient of hydrostatic pressure in resin 118 for tall workpieces. If the internal absolute pressure in front of soft tool 108 at the top of resin 118 is zero (it is under full vacuum), then the internal pressure near the bottom will be some pressure greater than zero (as a function of the resin's specific gravity and the height of the "column" of resin). If the product of the height of the resin column and the density of the resin are such that the hydrostatic pressure at the bottom of the resin column is greater than one atmosphere, the soft tool would billow outward (since the pressure behind the soft tool is only one atmosphere). If this were to happen, the soft tool would be not be applying any compaction pressure against the nascent composite.

Figure 1B:
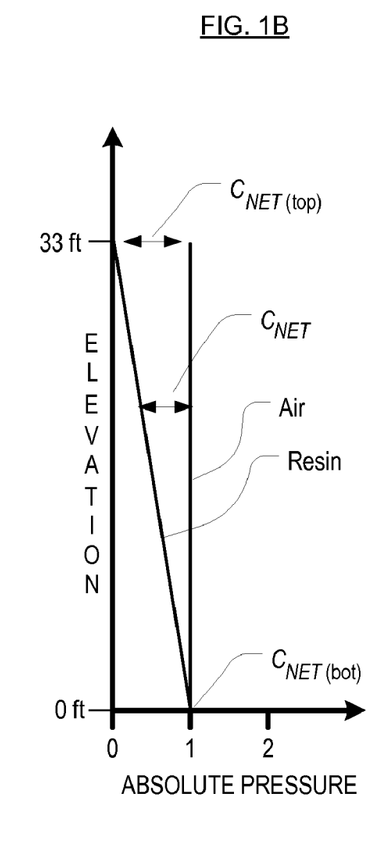
FIG. 1B depicts a plot of compaction pressure as a function of elevation up to a theoretical, but unrealized maximum of 33 feet, in a conventional, vertically oriented resin transfer molding apparatus.
Figure 2:
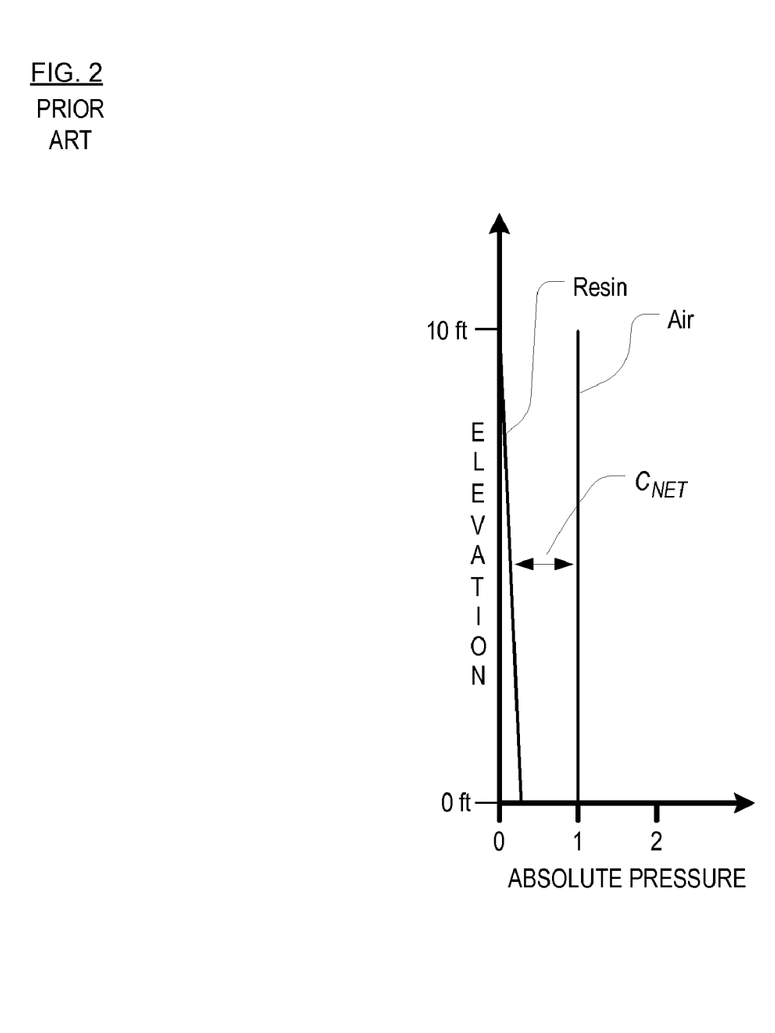
FIG. 2 depicts a plot of representative compaction pressure as a function of elevation in a conventional, vertically oriented VARTM process.

Since the density of the liquid resin is similar to water, the aforementioned effect places an absolute limit of about 33 feet on the height of a workpiece that can be made using VARTM. For a column of resin 33 feet high and under full vacuum, there would be zero absolute pressure at top of resin and 1 atmosphere absolute pressure at the bottom. Referring to FIG. 1B, for a column of resin 33 feet high, there would be one atmosphere net compaction pressure $C_{NET(top)}$ at the top of the resin (i.e., atmospheric pressure minus zero hydrostatic pressure) and zero compaction pressure $C_{NET(bot)}$ at the bottom (i.e., atmospheric pressure minus 1 atm hydrostatic pressure). This would produce very non-uniform composite properties, such as, for example, fiber volume fraction. This second effect (non-uniform properties) limits the practical working heights for a single "shot" of VARTM to about 10-15 feet, wherein an acceptable compaction pressure can be maintained across the whole workpiece, as depicted in FIG. 2. But such a height-limited apparatus will still experience non-uniform compaction pressure, which will result in non-uniform properties of the resulting composite. Furthermore, depending upon the ultimate length of the article being fabricated, this approach might be impractical since the height limitation might require too many molding runs (i.e., shots).

Available molding processes are therefore poorly suited for the production of very long and very wide composite articles that need to be produced via a vertically oriented molding.

SUMMARY OF THE INVENTION

The present invention overcomes the height limitation that otherwise arises due to insufficient and/or non-uniform compaction pressure, as experienced in conventional vertically oriented molding systems.

In the illustrative embodiment, an apparatus and a method in accordance with the present teachings are a modification of the VARTM process. In particular, rather than delivering air to a region behind the soft tool, a liquid is provided to that region. In the illustrative embodiment, the liquid has a specific gravity that is about the same as that of the resin being used in the process. Also, the liquid and resin rise to about the same elevation in the molding region. As such, the hydrostatic pressure of the liquid and the resin at any elevation will be the same. As a consequence of this arrangement, the compaction pressure, which is the pressure of the liquid minus the pressure of the resin at a given elevation, is constant.

In the illustrative embodiment, the liquid is placed under atmospheric pressure while the resin is placed under vacuum. Under these conditions, the compaction pressure is uniformly one atmosphere. In particular, at the top of the liquid, the pressure is one atmosphere. At the top of the resin, which is under (full) vacuum, the pressure is zero. The compaction pressure, which is the difference between the pressure behind the soft tool and the pressure in front of the soft tool, is one atmosphere. At the bottom of the liquid, the pressure is the one atmosphere plus the hydrostatic head of the liquid. At the bottom of the resin, the pressure is simply the hydrostatic head of the resin. Since, in the illustrative embodiment, the liquid and the resin have about the same specific gravity and the same height in the mold, the hydrostatic head is the same for both the liquid and the resin. As a consequence, the compaction pressure is simply one atmosphere. This pressure differential is maintained during resin cure.

After the resin cures, pressure behind the soft tool is released and, in some embodiments, vacuum is applied behind the soft tool to draw it away from the now-cured composite workpiece. The workpiece is then withdrawn from the molding region. In embodiments in which a plurality of such workpieces are to be fabricated, sequentially producing a larger final article, the process is then repeated to produce the requisite additional workpieces until the desired length is reached.

The methods and apparatuses disclosed herein facilitate the formation of a non-planar workpiece of arbitrary height. Although some factors might ultimately limit the height of a workpiece that can be formed using the present techniques (e.g., site conditions, etc.), insufficient or non-uniform compaction pressure will not be one of those factors. The present techniques can be used to form a single workpiece of arbitrary height or an article formed from plural workpieces of arbitrary height. Furthermore, the present techniques can be used to form an article, such as is disclosed in U.S. patent application Ser. No. 12/484,779, which comprises multiple molding shots and maintains complete continuity of fibers and fiber geometry across the shots within the primary load-bearing portions of the article.

DETAILED DESCRIPTION

Definitions. The terms appearing below are provided with the follow explicit definitions for use in this description and the appended claims.

Shot refers to the amount of resin that is required to fill a mold cavity. A "multi-shot" article requires multiple, sequential resin fills and cures within the mold cavity.

Workpiece means the structure that is produced or the assemblage (e.g., core, fiber, resin) that will form that structure in a single shot in the molding region. In the context of multi-shot articles, the workpiece therefore represents a portion or segment of the final composite article (e.g., a segment of the cold water pipe, etc).

Figure 3A:
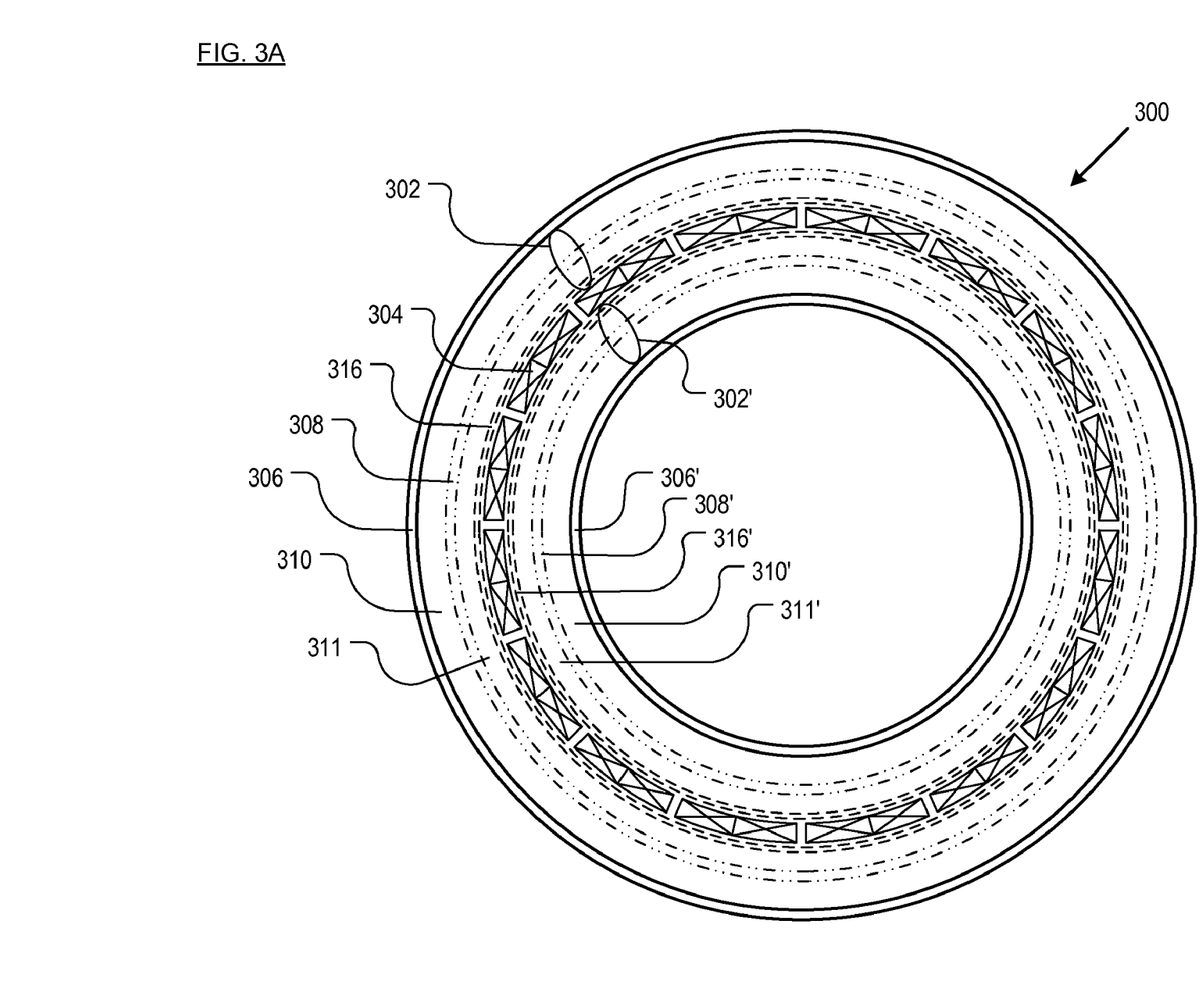
FIG. 3A depicts a top cross-sectional view through a vertically oriented molding apparatus in accordance with the illustrative embodiment of the present invention.

FIG. 3A depicts a top cross-sectional view through the molding region of a vertically oriented molding apparatus 300. Molding apparatus 300 is used to fabricate a cylindrical workpiece. It is to be understood, however, that the invention is not so limited; the particular form/shape of the workpiece is not germane to the invention. The invention enables the ability to fabricate, from a composite material, a workpiece of arbitrary "height" in the sense that the height of the workpiece is not limited by issues related to compaction pressure. Workpieces formed utilizing the present invention will typically be non-planar; planar workpieces can be more easily formed using a horizontally oriented molding apparatus.

Apparatus 300 includes a molding region that is defined between hard outer wall 306 and hard inner wall 306'. The molding region can be viewed as having two sub-regions 302 and 302'. Sub-region 302 is defined between hard outer wall 306 and hard tool or mold 304. Sub-region 302' is defined between hard inner wall 306' and hard tool 304. In apparatus 300, hard tool 304 comprises a plurality of arcuate segments that collectively define a cylindrical shape.

Sub-regions 302 and 302' are identical except for the relatively reduced diameter of sub-region 302'. Soft tool 308 is disposed within region 302 and soft tool 308' is disposed within region 302'. Both (inner) soft tool 308' and (outer) soft tool 308 are made of a resilient material that releases easily from cured composite articles, such as silicone rubber or the like. Region 310 is defined between hard outer wall 306 and soft tool 308. Region 310 is referred to herein as being "behind" the soft tool. Region 311 is defined between soft tool 308 and hard tool 304. Region 311 is referred to herein as being "in front of" the soft tool. Likewise, region 310' is defined between hard inner wall 306' and soft tool 308' and region 311' is defined between soft tool 308' and hard tool 304. Regions 310 and 310' behind the soft tools are fluidically isolated (gas tight/liquid tight) from respective regions 311 and 311' in front of the soft tool.

Reinforcement constituent 316 is disposed within region 311. Likewise, reinforcement constituent 316' is disposed within region 311'. The reinforcement constituent is typically fiber-based (as is used to produce a fiber-reinforced composite) and in a form such as a uni-directional tape, plain weave fabric, harness satin fabric, braided fabric, and stitched fabric.

Commonly-used fibers include, without limitation, fiber glass, commercially available from Owens Corning Technical fabrics, PPG, AGY and carbon fiber, commercially available from Zoltek and others. For convenience, reinforcement constituent 316 (316') will be referred to as "fiber" or "fabric."

Figure 3B:
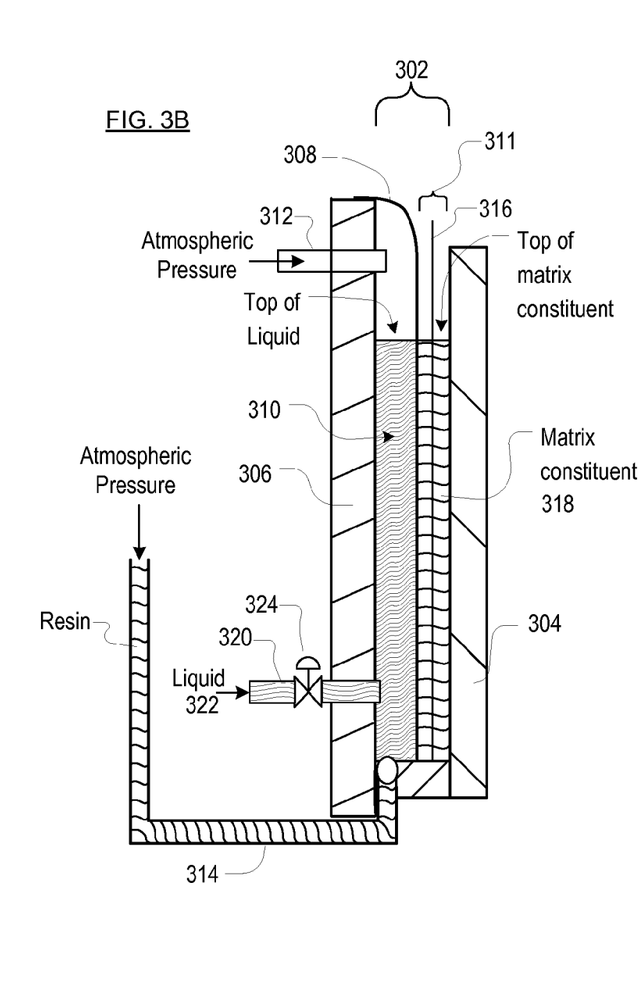
FIG. 3B depicts a side cross-sectional view through a portion of the apparatus of FIG. 3A.

Referring now to FIG. 3B, which is a side cross-section through molding sub-region 302 on the "left" side of apparatus 300, the apparatus further includes resin supply conduit 314, liquid supply conduit 320, and gas conduit 312. Although the operation of apparatus 300 will be described below in conjunction with molding sub-region 302 of FIG. 3B, it is to be understood that the same processes are occurring at all circumferential locations throughout molding sub-regions 302 and 302' (see FIG. 3A).

In operation, liquid 322 is introduced to region 310 behind soft tool 308 via liquid supply conduit 320. The liquid matrix constituent 318 of the nascent composite is introduced to region 311 in front of soft tool 308 via resin supply conduit 314 and is infused through fabric 316. Typically, a metering-mixing pump (not depicted) that combines catalyst (for curing) and matrix constituent in correct proportion supplies the matrix constituent to the resin supply conduit(s). In the illustrative embodiment, matrix constituent 318 is drawn up to the same elevation or level as liquid 322. Although shown for clarity as a single conduit, it will be appreciated by those skilled in the art that matrix constituent is typically introduced to molding apparatuses through multiple inlet lines and at various locations using techniques known in the art. The design and layout of the resin supply lines is not, however, germane to the invention and will not be discussed in further detail.

In the illustrative embodiment, matrix constituent 318 is a liquid resin. A variety of resins can be used in conjunction with the present invention; commonly used low-viscosity resins suitable for VARTM (apparatus 300 is a modification of the VARTM process), for example, include polyester, vinyl ester, epoxy, phenolic, polyimide, and polyamide. For convenience, matrix constituent 318 (318') will be referred to as "resin." Those skilled in the art will know how to suitably select a resin as a function of the article that is being produced.

Conduit 312 is in fluidic communication with region 310 behind soft tool 308. This conduit is used to place region 310 under vacuum for the performance of certain operations in the molding process, as discussed later in this specification. More germane to the present invention, conduit 312 is also used to place region 310 under atmospheric (or higher) pressure. In some other embodiments, separate lines are used for pulling a vacuum and for positively pressurizing region 310.

Liquid 322 that is introduced into region 310 as well as any additional pressurization (e.g., exposure to the atmosphere, pressurized gas, etc.) introduced via conduit 312 provides a source of compaction pressure. This compaction pressure pushes the soft tool against fabric 316, thereby compacting it to produce a composite with a controlled and desired fiber volume fraction.

In preferred embodiments, liquid 322 is selected so that its specific gravity is as close as possible to that of the resin. For example, if the vinyl ester resin Derakane® 8084, which is commercially available from Ashland Inc. of Covington, Ky., is selected for use as resin 318, then liquid 322 can be a 6% sugar/water solution, which has a specific gravity nearly identical to that resin.

Figure 3C:
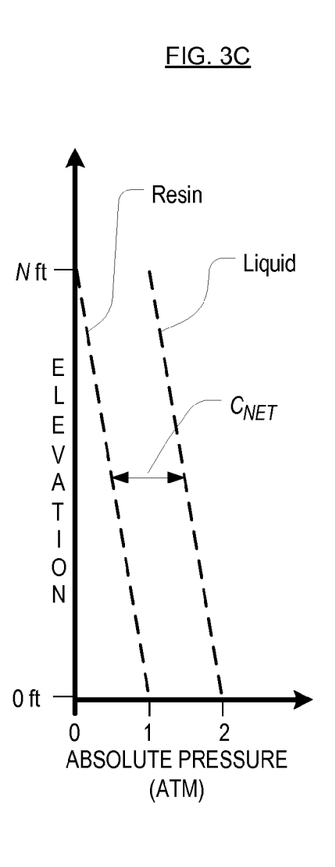
FIG. 3C depicts a plot of compaction pressure as a function of elevation for the apparatus of FIGS. 3A/3B.

By selecting liquid 322 such that is has a specific gravity that is about the same as that of liquid resin 318, a uniform compaction pressure can be maintained against the resin-infused fiber in region 211 at all elevations. Referring to FIG. 3C, with liquid 322 and resin 318 at the same height, the vertical hydrostatic pressure gradient in compacting liquid 322 matches the hydrostatic pressure gradient in liquid resin 318, as illustrated by the identical slopes of the elevation-pressure plots for the resin and the liquid. With liquid 322 under atmospheric pressure, and resin 318 under full vacuum, compaction pressure $C_{NET}$ is a uniform one atmosphere, irrespective of elevation. In some other embodiments, liquid 322 is placed under an elevated pressure. In such embodiments, the compaction pressure will again be uniform and simply equal the elevated pressure (assuming that the resin is under full vacuum). For example, if compressed gas at 3 atmospheres absolute pressure is admitted to region 310, and resin is maintained under full vacuum, then the compaction pressure will be a uniform 3 atmospheres.

Maintaining uniform compaction pressure is of considerable advantage for producing a high and uniform fiber volume fraction everywhere in the face sheets of a tall workpiece. It is notable that pressure at the top of liquid-filled region 310 can be any pressure that is greater than the pressure on the resin. Typically, the resin will be under full or partial vacuum. The choice of pressure on region 310 is simply a matter of selecting a desired compaction pressure, which is within the capabilities of those skilled in the art.

It is notable that with liquid 322 behind soft tool 308, there is no "theoretical" limitation on the height of the resin column (to maintain compaction pressure) in region 311, as discussed in conjunction with FIGS. 1B and 2. Uniform compaction pressure can be maintained even for workpieces that are in excess of thirty three feet in height. Other considerations may, however, limit the height of the molding apparatus and, hence, the height of any workpiece produced therefrom.

To the extent the specific gravity of liquid 322 differs from the specific gravity of resin 318, compaction pressure will not be uniform; that is, it will vary with elevation. The greater the difference in specific gravity, the greater the variation in compaction pressure with elevation. But with liquid 322 present behind soft tool 308 in accordance with the present invention, that variation will be less than if air were present, as in the prior art. Those skilled in the art can readily establish a maximum acceptable difference in specific gravity between liquid 322 and resin 318 by setting a maximum acceptable variation in compaction pressure between the top and bottom of the resin.

Figure 4:
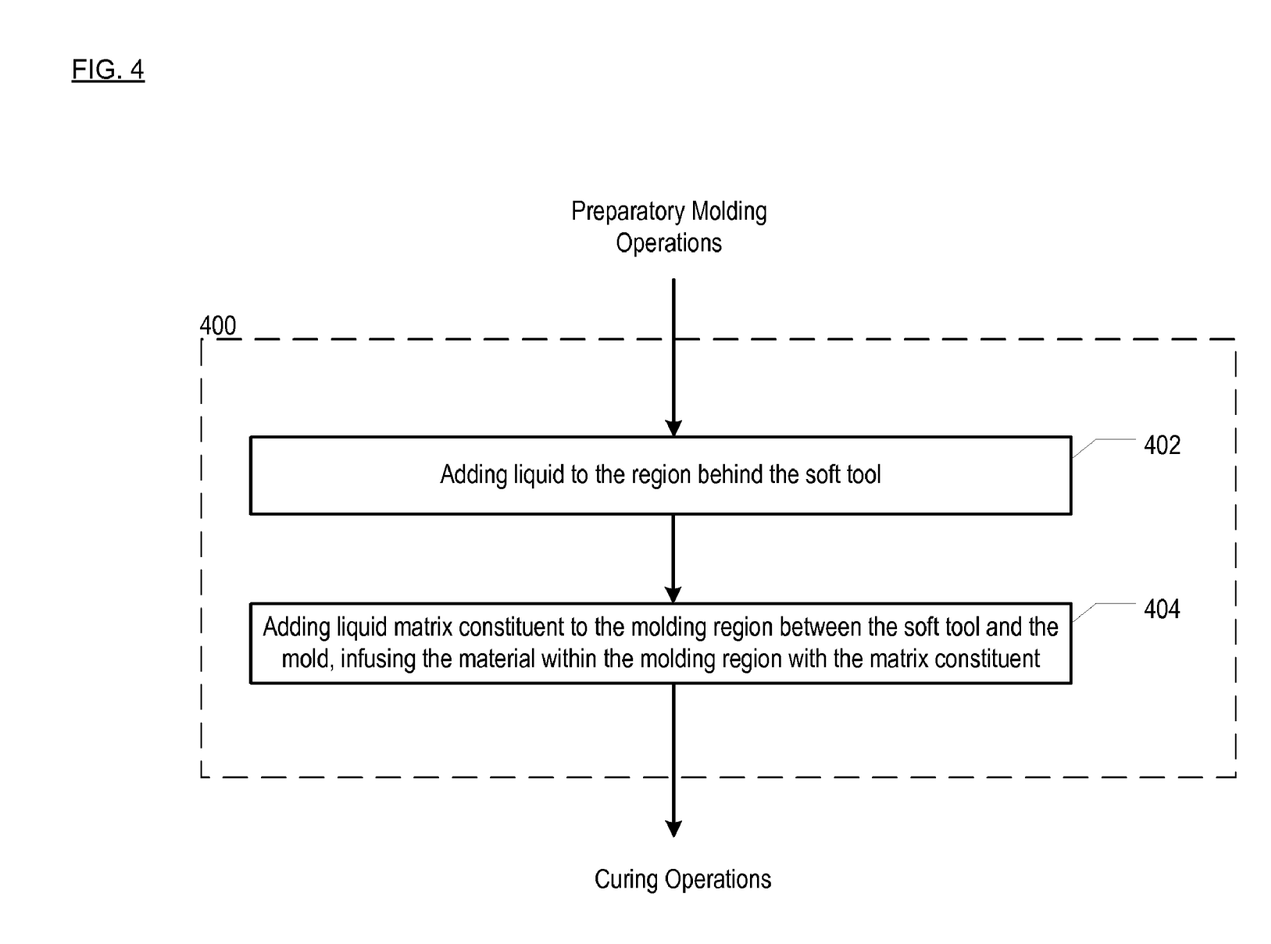
FIG. 4 depicts a method in accordance with the illustrative embodiment of the present invention for maintaining constant compaction pressure in a vertically oriented molding apparatus.

FIG. 4 depicts method 400 for improving the uniformity of compaction pressure in a vertically oriented molding apparatus in accordance with the illustrative embodiment of the present invention. As recited in operation 402, liquid (i.e., liquid 322) is added to the region (i.e., region 310) behind the soft tool (i.e., soft tool 308). In operation 404, liquid resin is added to the region (i.e., region 311) between the soft tool and the hard tool. Resin is infused into the fiber within the molding region under vacuum and applied compaction pressure, as previously disclosed.

Figure 5:
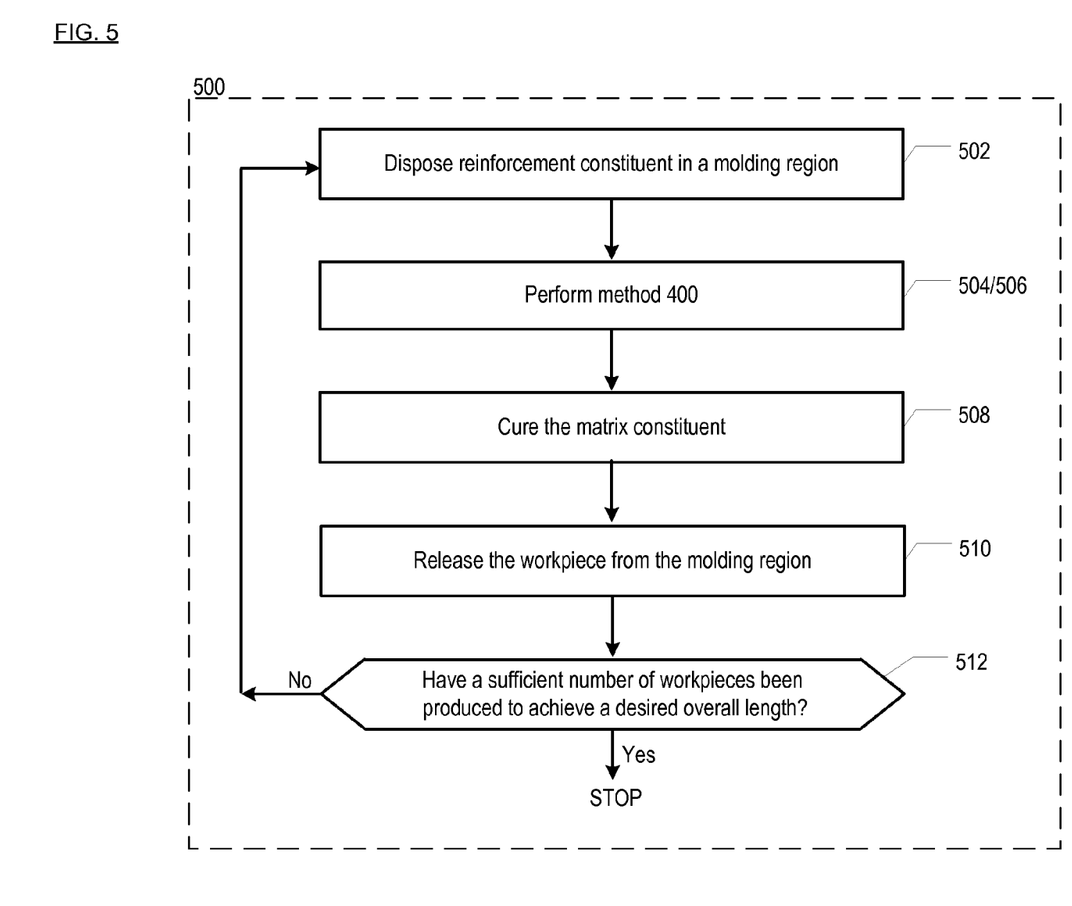
FIG. 5 depicts a method for fabricating a composite article that incorporates the method of FIG. 4.

FIG. 5 depicts the use of method 400 in conjunction with method 500 for forming a composite article via a vertically oriented molding apparatus, such as apparatus 300.

Operation 502 of method 500 recites disposing a reinforcement constituent (e.g., fabric, etc.) in the molding region of the molding apparatus. To facilitate this operation, vacuum is pulled behind the soft tool(s). This is one of the operations in which a vacuum is drawn behind the soft tool. In embodiments in which the apparatus is a vacuum-assisted resin transfer molding system (the current method incorporates VARTM techniques), a "resin distribution material" (not depicted) is disposed, along with the fabric, in the molding region. The resin distribution material facilitates quick spreading of the liquid matrix constituent (e.g., resin, etc.) over the full extent of the fiber. An example of a suitable resin distribution material is EnkaFusion® brand flow medium available from Colbond-USA, of Enka, N.C. As an alternative to using a resin distribution material, grooves can be provided in the surface of the hard tool.

Operations 504 and 506 are the operations of method 400; that is, "add liquid to the region behind the soft tool" and "add the matrix constituent to the region between the soft tool and the hard tool."

Before conducting operations 504 and 506, air is typically evacuated from the region in front of the soft tool (e.g., region 311) thereby reducing, to the extent possible, the void content of the resulting workpiece. After evacuating air, the fabric (and the resin distribution medium) in the molding region are compacted against the hard tool. This is accomplished, as previously discussed, by exerting pressure behind the soft tool (e.g., soft tool 308). In the illustrative embodiment, the pressure is exerted by introducing a liquid (e.g., liquid 322), such as water, into the region (e.g., region 310) behind the soft tool. In the illustrative embodiment, liquid is delivered through liquid supply conduit (e.g., conduit 320).

In some other less-preferred embodiments, a pressurized gas can be supplied to region 310 rather than a liquid. If a pressurized gas is used, there will not be a pressure gradient in the region behind the soft tool. As such, compaction pressure will not be uniform.

In some other embodiments, liquid 322 can be fed to region 310 from a reservoir (not depicted) located at an elevation that is lower than the molding region (e.g., region 302). Liquid can be drawn from or returned to the reservoir by simply altering pressure in region 310. In other words, to draw liquid into region 310 from the reservoir, region 310 is placed under vacuum. To retain the liquid in region 310, a valve (e.g., valve 324 in FIG. 3b) that controls the flow of liquid into and out of the reservoir is closed. Conversely, by releasing the vacuum in region 310 and opening the valve, liquid can be returned to the reservoir by gravity.

Resin is introduced along the bottom of the molding region via a resin supply conduit 314. To facilitate delivery of the resin, the portion of soft tool 308 near resin supply conduit 314 is drawn away from hard tool 304. This can be accomplished, for example, using circular tubular vacuum actuator (not depicted) placed between soft tool 308 and hard (outer) wall 306. This creates a passage near the outlet of the resin supply conduit for receiving resin and distributing it around the circumference of the workpiece. With pressure still being exerted behind the soft tool and with fiber still under vacuum, the resin infuses the fiber, rising toward the top of molding region 302. The amount of resin introduced into the molding region is controlled so that the flow front (i.e., the upper resin level in the fabric) stops at or below the level of the liquid behind the soft tool so that the resin remains in a region where compaction pressure is being applied. In this manner, geometry of the workpiece being formed is controlled everywhere within the molding region.

In operation 508, the resin is cured (e.g., via the catalyst/time/heat). Compaction pressure is maintained behind the soft tool while the resin cures.

After the resin cures to a self-supporting solid, the pressure behind soft tool 308 is released. The soft tool is pulled away from the workpiece by applying vacuum to region 310 behind the soft tool. In some embodiments, either before or after the soft tool is released, the workpiece is "post cured." If post curing is performed before release of the soft tool, it is typically performed by heating and circulating the same liquid that is used to pressurize region 310 behind the soft tool. If post curing is performed after release of the soft tool, it is typically accomplished by circulating hot air between the workpiece and the soft tool.

After the workpiece is fully cured, it is removed from the molding region as per operation 510. If the article being produced is a multi-shot article, such that the workpiece produced is one of many segments in the final article, then query, in operation 512, whether or not the desired length of the article being fabricated has been reached. If not, return to operation 502, wherein the process is repeated by disposing more fabric into the molding region to fabricate another workpiece. It is notable that in embodiments wherein "continuity of fiber" is maintained, such as those disclosed in U.S. patent application Ser. No. 12/484,779, the reinforcement constituent is "automatically" pulled into the molding region when a workpiece is lowered from the apparatus. In such embodiments, operation 512 loops back to operations 504/506 (adding liquid to the region behind the soft tool and adding resin to the region in front of the soft tool.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for use in a vertically oriented molding apparatus, wherein the molding apparatus includes a molding region having a soft tool and a hard tool, wherein the hard tool is disposed on a first side of the soft tool, wherein the method comprises:

disposing a reinforcement constituent on the first side of the soft tool between the soft tool and the hard tool wherein continuity of fiver is maintained between a supply of the reinforcement constituent fabric and the reinforcement constituent disposed on the first side of the soft tool;

adding liquid, under atmospheric pressure, to a region on a second side of the soft tool until an uppermost level thereof reaches a first elevation;

adding a liquid matrix constituent, under vacuum, to the first side of the soft tool until a flow-front thereof reaches the first elevation, wherein the liquid has a specific gravity that is substantially the same as a specific gravity of the liquid matrix constituent; and curing the liquid matrix constituent to form a workpiece, wherein a uniform compaction pressure is maintained against the reinforcement constituent and liquid matrix constituent at all elevations during curing.

2. The method of claim 1, wherein, after the workpiece is formed, releasing the workpiece from the molding region, which, due to the continuity of fiber, causes additional reinforcement constituent to feed to the molding region from the supply thereof.

3. The method of claim 1 further comprising disposing a discrete length of core material into the molding region.

4. The method of claim 1 wherein the operation of adding a liquid matrix constituent further comprises adding at least a portion of the liquid matrix constituent at a location that is proximal to a bottom of the molding region.

5. A method for use in a vertically oriented molding apparatus, wherein the molding apparatus includes a molding region having a soft tool and a hard tool, wherein the hard tool is disposed on a first side of the soft tool, and wherein the method comprises:

disposing fiber in a molding region on the first side of the soft tool between the soft tool and the hard tool, wherein continuity of fiber is maintained between a supply of the fiber and the fiber in the molding region;

adding resin, under vacuum, to the first side of the soft tool; and adding liquid, under atmospheric pressure, to a first elevation on a second side of the soft tool, wherein a specific gravity of the resin and a specific gravity of the liquid are substantially the same, and further wherein a flow front of the resin does not exceed the first elevation, wherein a uniform compaction pressure is maintained against the fiber and the resin at all elevations.

6. The method of claim 5 wherein the operation of adding resin further comprises adding at least a portion of the resin at a location that is proximal to a bottom of the molding region.

7. The method of claim 5 further comprising curing the resin.

8. The method of claim 7 further comprising releasing a workpiece that is formed when the resin cures.

9. The method of claim 8 and further wherein due to continuity of fiber, the operation of releasing the workpiece further comprises causing additional fiber to feed to the molding region from the supply thereof.

10. The method of claim 5 further comprising disposing a discrete length of core material into the molding region.

* * * * *